(12) United States Patent
Shortt

(10) Patent No.: US 7,271,921 B2
(45) Date of Patent: Sep. 18, 2007

(54) METHOD AND APPARATUS FOR DETERMINING SURFACE LAYER THICKNESS USING CONTINUOUS MULTI-WAVELENGTH SURFACE SCANNING

(75) Inventor: David W. Shortt, Milpitas, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 565 days.

(21) Appl. No.: 10/754,679

(22) Filed: Jan. 9, 2004

(65) Prior Publication Data

US 2005/0018183 A1    Jan. 27, 2005

Related U.S. Application Data

(60) Provisional application No. 60/489,616, filed on Jul. 23, 2003.

(51) Int. Cl.
*G01B 11/28* (2006.01)
(52) U.S. Cl. ..................................... 356/630
(58) Field of Classification Search ............... None
See application file for complete search history.

(56) References Cited

U.S. PATENT DOCUMENTS

| | | | | |
|---|---|---|---|---|
| 4,929,083 A * | 5/1990 | Brunner | ...................... | 356/400 |
| 5,416,594 A | 5/1995 | Gross et al. | ................ | 356/237 |
| 5,940,175 A * | 8/1999 | Sun | .......................... | 356/237.3 |
| 6,208,750 B1 * | 3/2001 | Tsadka | ..................... | 356/237.4 |
| 6,307,627 B1 * | 10/2001 | Vurens | ........................ | 356/630 |
| 6,417,921 B2 * | 7/2002 | Rosencwaig et al. | ....... | 356/369 |
| 6,483,580 B1 * | 11/2002 | Xu et al. | ..................... | 356/300 |
| 6,556,652 B1 * | 4/2003 | Mazor et al. | ................. | 378/86 |
| 6,589,804 B1 * | 7/2003 | Halliyal et al. | ............... | 438/22 |
| 6,654,111 B2 * | 11/2003 | Isozaki et al. | ........... | 356/237.3 |
| 6,750,961 B2 * | 6/2004 | Niu et al. | ................. | 356/237.5 |
| 6,809,824 B1 * | 10/2004 | Yates et al. | ................. | 356/400 |
| 6,812,047 B1 * | 11/2004 | Borden et al. | ............. | 356/369 |
| 6,934,032 B1 * | 8/2005 | Subramanian et al. | ...... | 356/445 |
| 7,006,222 B2 * | 2/2006 | Krishnan | ..................... | 356/369 |
| 7,012,698 B2 * | 3/2006 | Patzwald et al. | ........... | 356/504 |
| 7,068,363 B2 * | 6/2006 | Bevis et al. | ............. | 356/237.5 |

* cited by examiner

*Primary Examiner*—Layla G. Lauchman
*Assistant Examiner*—Juan D. Valentin, II
(74) *Attorney, Agent, or Firm*—Beyer Weaver LLP

(57) ABSTRACT

An inspection tool includes an illumination element for directing light beams onto a workpiece at differing wavelengths or at differing angles of incidence or combinations thereof. Such beams producing reflected light and scattered light optical signals. A scanning element and optical detector elements are provided. The optical detector elements receive reflected light signals and scattered light signals. Circuitry for receiving the reflected light signals and scattered light signals are used to determine thickness values for partially transmissive layers formed on the workpiece and correct for the effects of the thickness of the partially transmissive layer so that said signals can be used to identify and characterize defects of the workpiece. Moreover, the invention includes descriptions of methods for accomplishing such inspections.

2 Claims, 7 Drawing Sheets

METHOD AND APPARATUS FOR DETERMINING SURFACE LAYER THICKNESS USING CONTINUOUS MULTI-WAVELENGTH SURFACE SCANNING

RELATED APPLICATION

This application claims priority to the U.S. Provisional Patent Application Ser. No. 60/489,616, entitled "Method And Apparatus For Determining Surface Layer Thickness Using Continuous Multi-Wavelength Surface Scanning", filed on Jul. 23, 2003. The above-referenced application is hereby incorporated by reference in its entirety for all purposes.

TECHNICAL FIELD

The invention described herein relates generally to surface inspection and testing. In particular, the invention relates to devices and methods for the determination of film thickness and defect detection in semiconductor wafer surfaces.

BACKGROUND

To control the quality of integrated circuits, semiconductor wafers or other substrates are inspected for defects by optically scanning the surface with a variety of inspection apparatus. Commonly, wafers have a mirror-like surface which is reflective of light, but many common optical inspection tools rely upon dark field scattering of light from particles and defects for inspection purposes. In these optical inspection tools illumination of the surface inspected produces two types of optical signals, the desired scattered light signals and an undesired specular (reflected) light signal which is commonly suppressed. The scattered light signals are derived from both defect scattering and from diffuse surface scattering known as "haze". The specularly reflected signal is the incident beam minus the components that are lost by scattering and absorption at the surface. In conventional tools, an exit aperture in the light collection optics or a beam dump has been used to rid the scattered light collection system of the undesired reflected beam signal.

At various stages of wafer processing, thin metallic and/or dielectric films, such as oxide or nitride layers, are deposited over the surface. Typically, such films demonstrate a certain amount of "transparency" to the wavelengths of light used to inspect the surface (an inspection beam). Thus, the inspection beam can penetrate the top layer(s) of the wafer to reach underlying (less transmissive) layers of the film. Such thin films have a thickness of between 10 angstroms and several tens of microns. It is important to know, for example, oxide thickness over the surface for several reasons. Uniformity of an oxide layer may be desired so that semiconductor devices employing the oxide layers will have uniform properties. The oxide layers are insulative and the electrical performance of semiconductor devices, such as transistors, rely upon an insulative layer of a particular thickness. Additionally and importantly, the deposition of thin layers can degrade defect (e.g., particle) measurement information obtained by analysis of the scattered light.

FIG. 1 is a simplified schematic illustration of an illumination beam 101 being directed onto a defect 102 (in this case a particle) present on a wafer 103 surface. The defect scatters the electric field at the surface creating scattered light signal S as well as a reflected light signal R in the specular direction. Such scattering is well known in the art and can be used to identify and quantify defects on a wafer surface. A complicating factor in the depicted illustration is the presence of one or more partially transmissive layers 104 on the surface of the wafer 103. Such partially transmissive layers have the effect of transmitting certain wavelengths of light through the layer. This is particularly troublesome when the layer is transmissive to the wavelength(s) of light of the illumination beam 101. Such partially transmissive layers can be comprised of many different materials, but particularly common examples include silicon oxides and silicon nitrides. As can be seen in FIG. 1, a portion 101a of the illumination beam 101 can penetrate into the at least partially transmissive layer 104 and be at least partly reflected by an underlying surface 105. This partly reflected portion 101b is also scattered by the defect 102 thereby contributing to the scattered light signal S. This can cause a significant variance to the expected scattered light signal. Thus, the scattered light that is typically used to characterize the defect 102 (for example to determine defect size) is now so altered that it exhibits significant deviations from an optical signal obtained from a surface having no partially transmissive layers.

Thus, thin layers of oxide or nitride (or other partially transmissive materials, including but not limited, to certain low-K dielectric materials) can significantly alter the radiation fields (light beams) and alter the expected scattering profile for a defect. In one example case, using a substrate having formed thereon a partially transmissive film that has an optical thickness of one-quarter of the wavelength of illuminating light, the strength of the radiation field at or near the surface is substantially reduced resulting in little light scattering for micron-sized defects lying on the surface. This can result in such defects being missed. Thus, knowledge of film thickness would be critical to compensating for this condition or avoiding measurements at such thicknesses.

Currently, tools exist that can measure film layer thickness. However, such tools are high precision tools that can only measure a few points on each wafer to determine thickness (commonly no more than 20-25 such measurements are made per wafer). Additionally and importantly, each measurement takes a long time to achieve. Thus, for such tools it is unrealistic to measure more than a few points on each wafer. As a result such tools provide accurate, but limited amounts of information and have no real capacity to characterize an entire surface. These tools are not capable of scanning an entire wafer and determining the thickness of a partially transmissive layer across the entire surface. Moreover, such tools cannot make thickness measurements while these tools are simultaneously making defect inspection measurements of the same surface.

Additionally, such tools cannot provide "wafer maps" of reflectivity behavior of an inspected surface. For example, current tools cannot provide high-density reflectivity measurements across an entire silicon wafer. Also, current tools cannot provide a reflectivity measurement map of an entire wafer having at least one layer of partially transmissive material formed thereon.

Additionally, for a variety of opaque films, it can be desirable to generate reflectivity maps of an entire wafer surface. This is particularly true for metal films, such as aluminum or tungsten, where knowledge of the reflectivity of the metallic layer, as well as surface scattering, can yield substantial information about the quality and uniformity of the film deposition. Current methodologies are not capable of scanning a surface and generating such maps. Additionally, such reflectivity maps of a surface can be used to enhance detection and yield a more accurate defect size distribution count, since defect scattering is strongly influenced by the surface optical parameters, such as reflectivity.

Additionally, current tools and methodologies do not have a way of rapidly scanning an entire wafer and using the wafer's reflectivity characteristics to determine critical dimension (CD) for the elements formed on the wafer's surface. Nor do current tools and methodologies have a way of rapidly scanning an entire wafer and using the wafer reflectivity characteristics to determine the alignment accuracy of a fabrication overlay during processing. Thus, there is a need for tools and methodologies capable of measuring surface reflectivity characteristics by continuously scanning a surface. Additionally, there is a need for tools and methodologies for measuring thin film thickness and characterizing defects in the same process. Also, there is a need for tools and methodologies capable of continuously scanning a surface to determine CD and determine the correct alignment of overlays constructed during fabrication.

SUMMARY OF THE INVENTION

In accordance with the principles of the present invention, surface inspection tools and methodologies are disclosed. In general, the embodiments of the invention concern inspection tools that generate a reflected optical signal from a substrate and then use the reflected optical signal to characterize (or assist in the characterization of) the inspected surface.

An inspection tool embodiment includes an illumination element for directing light beams, including a first beam and a second beam, onto a workpiece having a partially transmissive layer formed thereon to generate a reflected light signal and a scattered light signal for each of the light beams. A scanning element configured to provide relative motion of the light beams across the surface of the workpiece is provided. The tool includes a first, second and third optical detector element. The first optical detector element is arranged to receive first reflected light signals produced by the first beam and measure optical parameter values associated with the first reflected light signal translating the optical parameter values into an associated first electrical signal. The second optical detector element is arranged to receive second reflected light signals produced by the second beam and measure optical parameter values associated with the second reflected light signals and translate the optical parameter values into an associated second electrical signal. The third optical detector element is arranged to receive the scattered light signal from the workpiece and translate the scattered light signal into an associated third electrical signal. The tool has circuitry for receiving the first and second electrical signals and using said signals to determine thickness values for the partially transmissive layer. Additionally, the tool has circuitry for receiving the third electrical signals and thickness values for the partially transmissive layer and correcting for the effects of the thickness of the partially transmissive layer so that said third electrical signals can be used to identify and characterize defects of the workpiece.

Another embodiment of the invention addresses methods for conducting surface inspections. Such methods involve providing a workpiece and continuously scanning the surface of the workpiece with at least two light beams to generate at least two reflected light signals. The reflected light signals are detected and processed to characterize the surface of the workpiece. Particular embodiments of the invention include those where the at least two light beams have different wavelengths of light. Additionally, such embodiments include light beams having different wavelengths of light and being projected onto the surface of the workpiece at different angles. In still another embodiment, the light beams can have the same wavelengths of light but be projected onto the surface of the workpiece at different angles. Additional embodiments measure different aspects of the reflected light signal. Embodiments of the invention can be used to measure, for example, light intensity of the reflected optical signal, phase of the reflected optical signal, polarity of the reflected optical signal, and angle of the reflected optical signal.

Another embodiment involves continuously scanning the workpiece having a light transmissive layer with at least two light beams to generate at least two reflected light signals. The reflected light signals are detected and optical parameter values for each of the reflected light signals are measured. A parametric curve is accessed, the curve associating thickness for the partially transmissive layer with optical parameter values for the reflected light signals. The reflected light signals are then compared with the parametric curve to identify a thickness values uniquely associated with the measured optical parameter values for the reflected light signals and thereby determining a thickness for the partially transmissive layer for the entire surface of the workpiece. Additional embodiments can use this thickness information in conjunction with associated scattered light signals to determine, for example, the size of defects on the surface of the work piece.

Another embodiment of the invention is a method for conducting surface inspection that involves providing a workpiece having a plurality of test patterns formed thereon. The surface is scanned with polychromatic light to illuminate the test patterns of the workpiece to generate a reflected light spectrum. The reflected light spectrum is detected and compared with the polychromatic light beam to characterize attributes of the workpiece surface.

These and other aspects of the present invention are described in greater detail in the detailed description of the drawings set forth hereinbelow.

BRIEF DESCRIPTION OF THE DRAWINGS

The following detailed description will be more readily understood in conjunction with the accompanying drawings, in which:

FIG. 2($b$) is a graphical depiction of scattered light intensity compared to thickness of a partially transmissive layer formed on an inspected surface.

It is to be understood that, in the drawings, like reference numerals designate like structural elements. Also, it is understood that the depictions in the Figures are not necessarily to scale.

DETAILED DESCRIPTION OF THE DRAWINGS

The present invention has been particularly shown and described with respect to certain embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

The following detailed description describes various embodiments of surface inspection tools and methods for their use. In particular, embodiments of the present invention scan an entire wafer surface and measure a reflected optical signal and use such measurements to characterize the surface of the wafer. In some embodiments, both a scattered light signal and the reflected light signal are measured to determine the thickness of partially transmissive layers on the surface and determine the size of defects on the surface. Further characterizations of the surface are also possible in accordance with the principles of the invention.

Figure 2A:
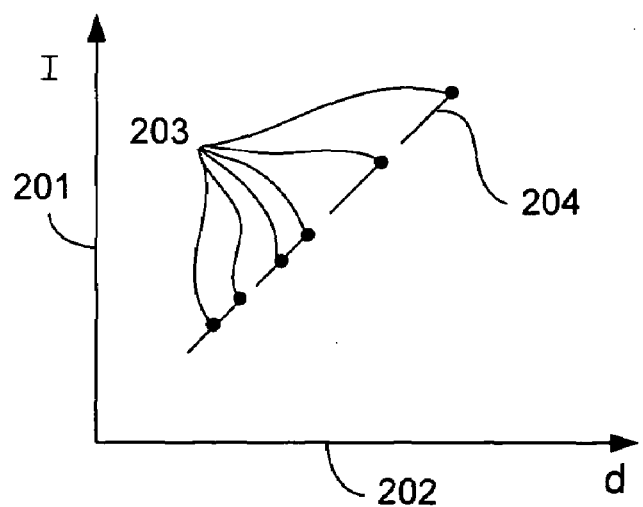
FIG. 2($a$) depicts a calibration curve associating particle size with intensity for a reflected light signal.

In conventional defect detection on an opaque surface the size of a defect is related to the amount of light scattered by the defect. This concept is schematically illustrated by FIG. 2(a) where the vertical axis 201 corresponds to light scattered (intensity I) by the inspected surface (including defects) and the horizontal axis 202 corresponds to the size d of a defect generating the scattering. The data points 203 correspond to defect size/scattering intensity pairs. On an opaque surface such data points 203 can easily be used to generate calibration curve 204 using defects of known sizes. This calibration curve 204 can then be used to size defects of unknown size.

Figure 1:
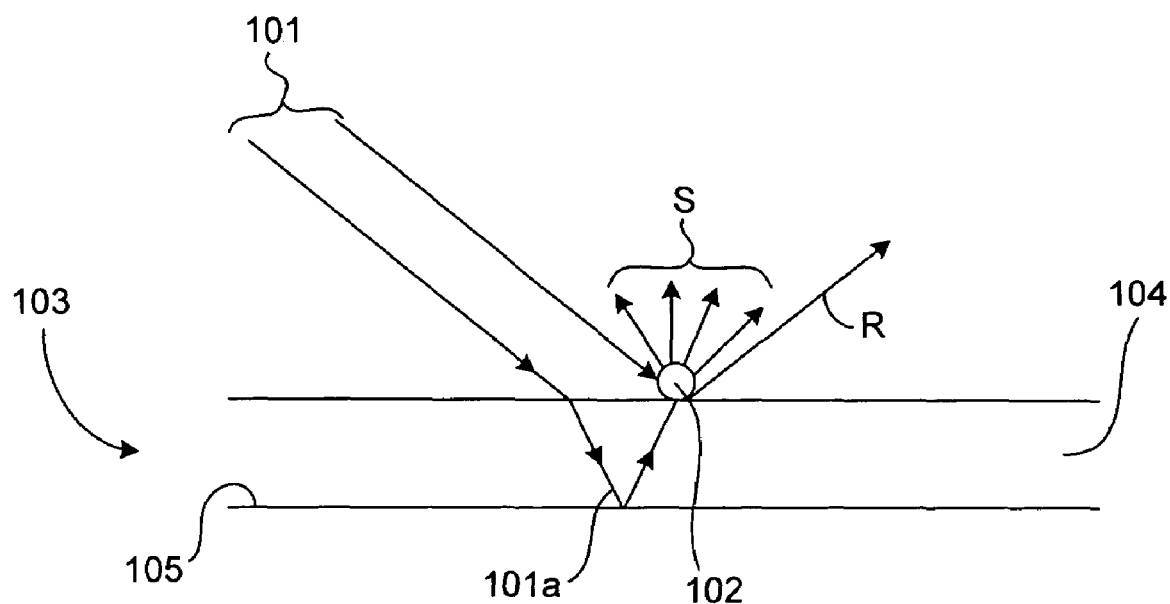
FIG. 1 is a simplified schematic cross-sectional view showing an incident light beam being scattered from a particle on a semiconductor wafer surface.

As previously indicated, the picture gets considerably more complicated when the top portions of the substrate include a thin layer of at least partially transmissive material (e.g., as depicted in FIG. 1). An at least partially transmissive layer is formed of material that allows at least some portion of light at a specific wavelength (or bands of wavelengths) to be transmitted through the material. Such layers can play havoc with existing inspection schemes that use scattered light to inspect for and size defects in the surface. Thus, the effects of the layer of partially transmissive material must be compensated for in order to accurately determine the size of (or in some cases the presence of) defects.

Figure 2B:
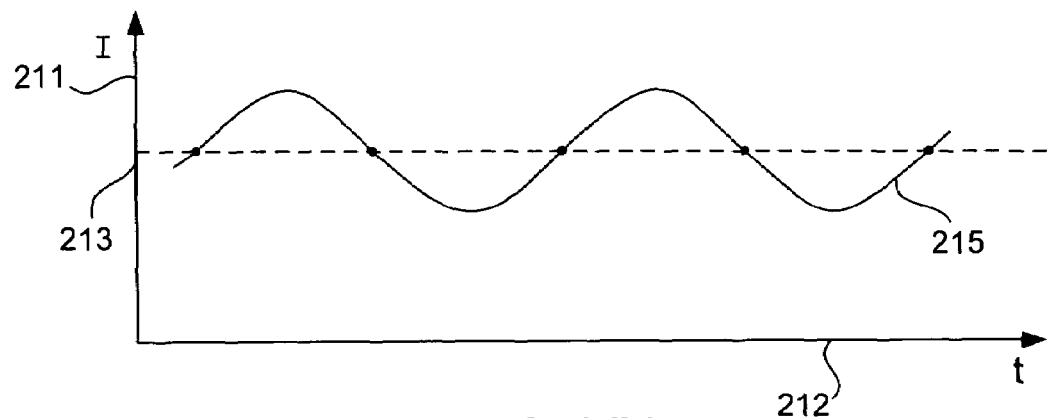

FIG. 2(b) is a simplified graphic depiction of scattered light behavior that will be helpful in illustrating some aspects of the problem. The verticle axis 211 corresponds to light scattered (intensity I) by the inspected surface (including defects) and the horizontal axis 212 corresponds to a thickness t for the partially transmissive layer. Commonly, a "periodic" relationship between thickness t and scattering intensity I can be defined. This relationship is depicted by curve 215 which describes the scattering behavior of a light beam at a first wavelength over a range of thicknesses for the partially transmissive layer. What is immediately apparent is that many different thicknesses can result in any given scattering intensity (e.g., intensity 213). Thus, referring to FIG. 2(a), because the partially transmissive layer radically affects the measured scattering intensity I (and therefore, calibration curve), any given measured scattering intensity I can correspond to many different particle sizes, unless the thickness of the partially transmissive layer is known.

As previously explained, there are in the art, methods for determining the thickness of partially transmissive layers of substrates. However, such methods can only determine such thicknesses at a few selected points on the surface and such methods are extremely time consuming. Since the thickness of the partially transmissive layer can vary significantly over the entire surface, such individual point measurements do not tell how thick the partially transmissive layer at the point where a specific measurement of light scattering is made. Thus, such measurements are rather less than useful.

Heretofore, no method or device has been constructed that can continuously scan an entire wafer surface and generate a wafer map that tracks the reflected optical signal thickness over the entire surface of the wafer. Analogously, no method or device has been constructed that can continuously scan an entire wafer surface and generate a wafer map that tracks the thickness for a partially transmissive layer over the entire surface of the wafer. Moreover, such thickness measurements made by the present invention can by conducted simultaneously with defect scanning of the same portions of the wafer. Thus, thickness information and defect information can be obtained at the same time allowing rapid defect and thickness characterization for an inspected surface (typically, a semiconductor wafer). Some embodiments for so inspecting a wafer are capable of inspecting an entire 300 mm wafer in 15-20 seconds. These are some of the many advantageous features of the present invention. These, and other advantageous features will be described in detail hereinbelow.

Some embodiments of the present invention make use of the fact that the light reflectance behavior of each partially transmissive layer (constructed of a known material) varies depending of the wavelength of illumination light. As discussed before, when a partially transmissive layer is illuminated with light at a particular wavelength a pattern of light intensity as related to thickness t of the partially transmissive layer can be established. Additionally, when the wavelength of illuminating light is changed, a different pattern of light intensity as related to thickness t can be established.

Figure 3:
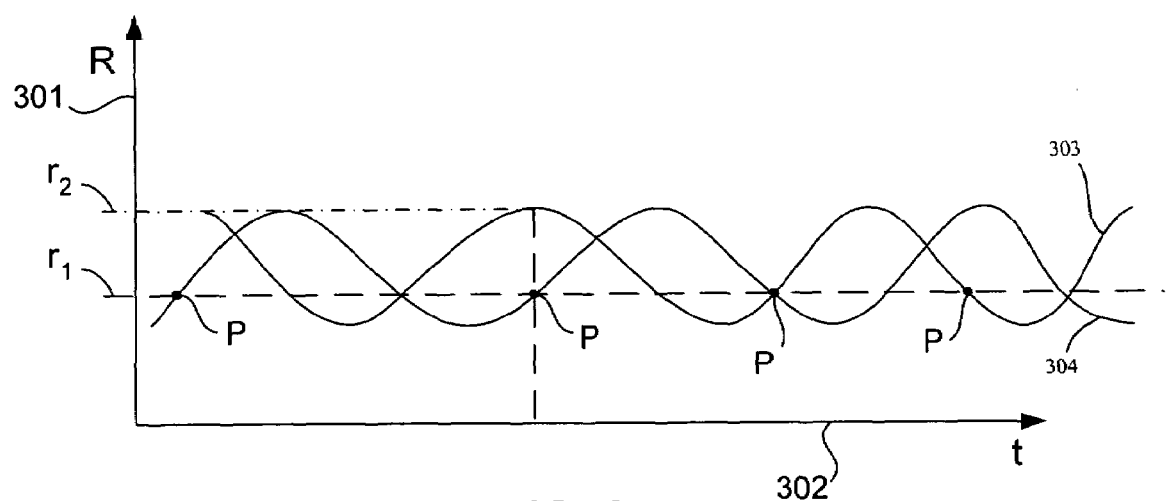
FIG. 3 is a graphical depiction of reflected light intensity compared to thickness of a partially transmissive layer for two light beams of different wavelengths.

FIG. 3 depicts a simplified graphic representation of the reflected optical signal patterns of two light beams having different wavelengths. The verticle axis 301 represents an optical parameter for the reflected optical signal R (for example, intensity of the reflected optical signal) and the horizontal axis 302 represents thickness t of the partially transmissive layer. A wafer having a partially transmissive layer constructed of a known material formed thereon is provided. Each beam is projected onto the same point of a wafer to produce a reflected optical signal. For each wavelength, each material corresponds to a specific characteristic "periodic" pattern of reflected optical signal values versus thickness of the material. Apparatus and methods of the present invention when provided with the material type can call up from a database the appropriate pattern. Alternatively, such patterns can be generated in accordance with specified algorithms.

It can be seen that light at a first wavelength (e.g., 488 nm) generates a first pattern 303 of reflected light intensity as related to thickness t of the material comprising the partially transmissive layer. If, for example, a first reflected intensity $r_1$ is measured and correlated with the first pattern 303, the thickness t of the partially transmissive layer cannot be determined. Rather a multiplicity of possible thicknesses P is all that can be discerned. However, if a second wavelength of light (e.g., 633 nm) is also projected onto the same point, a different pattern 304 of reflected light intensity versus thickness t of the material is generated. By measuring a second reflected intensity $r_2$ and comparing the value to the pattern 304, the thickness t of the partially transmissive layer can now be determined. Frequently, there is only one thickness t that corresponds to both the measure reflected intensity value $r_1$ at the first wavelength (e.g., 488 nm) and to the measured reflected intensity value $r_2$ at the second wavelength (e.g., 633 nm). Because, such wavelength dependent behavior is known, for each partially transmissive material (e.g., $Si_3N_4$, $SiO_2$, and many other materials used in semiconductor fabrication, including without limitation, many low-K dielectric materials) a wavelength dependent pattern of reflected light intensity R versus thickness t can be determined. Typically, such patterns are saved in the memory of apparatus embodiments constructed in accordance with the principles of the invention or such patterns can be generated by such embodiments using algorithms and techniques known to those having ordinary skill in the art.

Figure 4:
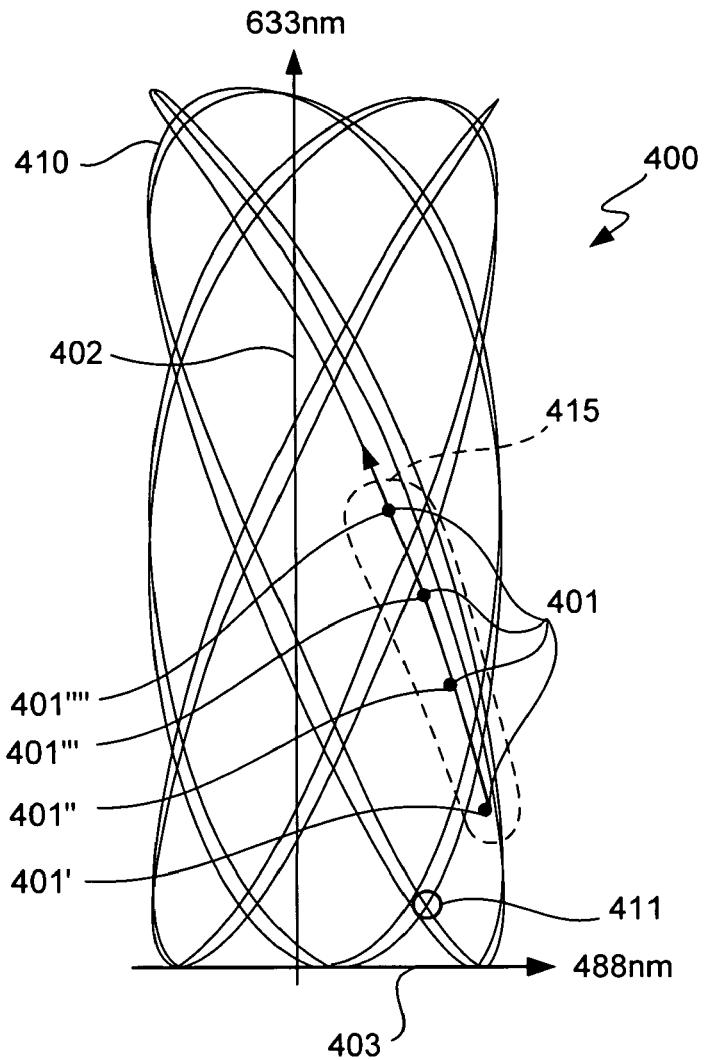
FIG. 4 is a graphical depiction parameterizing reflected light intensity at two different wavelengths over a range of different thicknesses for a partially transmissive layer in accordance with the principles of the invention.

FIG. 4 presents a graphic depiction of another approach to determining a thickness for partially transmissive layers. In such an approach a parametric plot 400 is used to correlate measured optical parameters of a reflected beam to thickness t for a partially transmissive layer on a substrate. As depicted, the measured optical parameter corresponds to the intensity of the reflected light signal at a given wavelength. Each data point 401 corresponds to a thickness t for the partially transmissive layer on a substrate. Also, in the depicted embodiment, the vertical axis 402 is related to the intensity of the reflected light signal at a first wavelength (e.g., 633 nm). Similarly, the horizontal axis 403 is related to the intensity of the reflected light signal at a second wavelength (e.g., 488 nm). Thus, the parametric curve 410 is a plot of reflected light signal intensity at two different wavelengths as related to thickness for the partially transmissive layer. As depicted, the data points 401 correspond to increasing thickness of a partially transmissive layer, with data point 401'''' being thicker than data point 401''' and data point 401''' being thicker than data point 401'', and so on. In the highlighted portion 415 of the parametric curve 410 the intensity of the reflected light signal at the first wavelength increases as the thickness of the partially transmissive layer increases. Also, the intensity of the reflected light signal at the second wavelength decreases as the thickness of the partially transmissive layer increases. Because each point on the parametric curve 410 corresponds to a thickness of the partially transmissive layer, it can readily be seen that the vast majority of parametric value combinations correspond to a single thickness for the partially transmissive layer. However, a few exceptions are noted. For example, the parametric curve 410 "crosses" at the point in the circled region 411.

Figure 5:
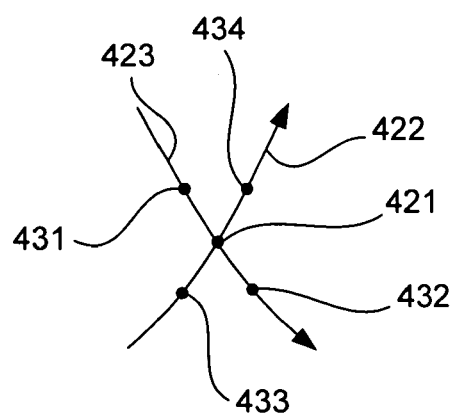
FIG. 5 is a close-up view of the parameterized graphical depiction of FIG. 4.

FIG. 5 is an expanded view of the circled region 411. The crossing point 421 corresponds to two thicknesses having the same parametric values (here, measured reflected light intensity values at two different wavelengths). One way to determine the correct thickness is for the inspector to be aware of the approximate thickness range of the partially transmissive layer. Thus, if the crossing point 421 corresponds to a layer 8 microns (μm) thick and also to a layer 2 μm thick and it is known that the layer on the wafer is in the range of 1-3 μm thick it is very likely that the actual layer thickness corresponds to 2 μm thick. However, the inspector may not always have access to such thickness information. Alternatively (and more commonly), the actual thickness differences are much closer together and therefore less easily resolved by such methods. For example, if the crossing point 421 corresponds to a layer 1.8 microns (μm) thick and also to a layer 2.5 μm thick and it is known that the layer is in the range of 1-3 μm thick such a method does not provide the needed clarity. However, one method that can be used to identify the correct thickness is to move in a known thickness direction to determine the thickness of the layer. Such a method can work as follows. Referring to the portion of the curve defined by line 434 it is known that a thickness of 1.6 μm corresponds to point 433 and also that point 434 corresponds to a thickness of 2.0 μm. Thus, moving along line 422 is defined by an arrow moving up and to the right as the thickness increases. Also, referring to the portion of the curve defined by line 423 it is known that a thickness of 2.6 μm corresponds to point 431 and also that point 432 corresponds to a thickness of 2.5 μm. Thus, moving along line 423 is defined by an arrow moving down and to the right as the thickness decreases. Thus, the inspector can measure the optical parameters for a point known to be thicker than 1.8 μm (e.g., 2.0 μm) and observe which way the readings move on the curve. If for example, the readings move from point 421 up along line 422 toward point 434 the inspector knows that the thickness for point 421 is about 1.8 μm. Moreover, other techniques of thickness determination based on using two wavelengths of light known to persons having ordinary skill in the art can be used.

In another related approach, another beam (for example, at a third wavelength) can be introduced. Thus, each data point can be parameterized in three dimensions. This will result in a complicated three-dimensional parameterization curve. It is very unlikely that such parameterized curves will have 3-D crossing points. Therefore, in such a three beam (three axis) approach the thickness can be more easily determined. Referring, for example, to FIG. 4, the third axis (beam) can simply extend into (or out of) the page.

Figure 6A:
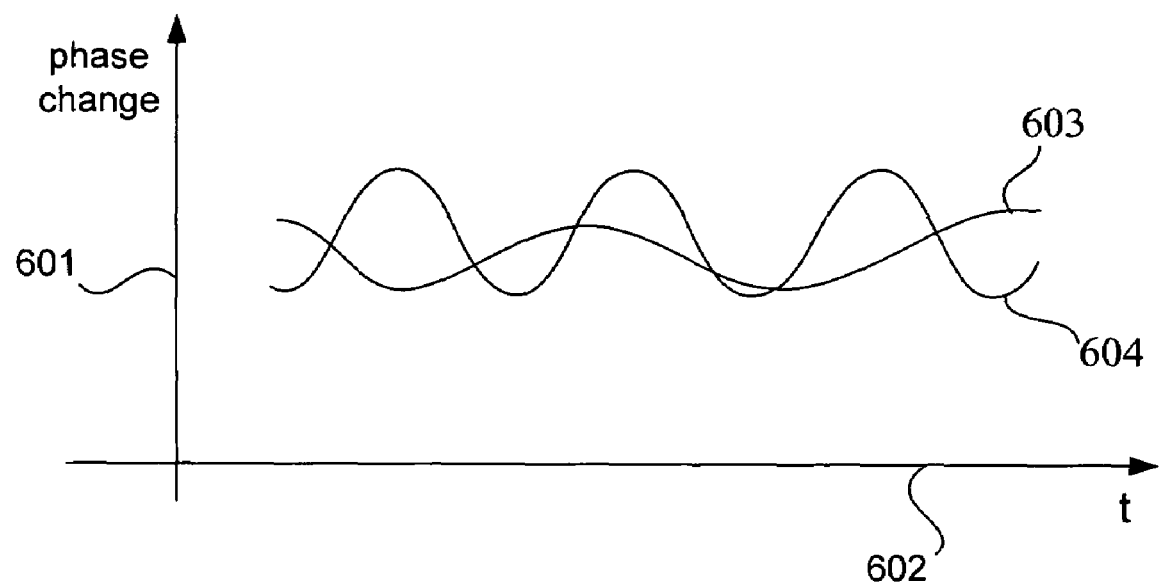
FIGS. 6($a$) and 6($b$) are simplified graphical depictions of some optical parameters (e.g., phase, polarity, light collection angle, angle of incidence) of a reflected light beam compared to thickness of a partially transmissive layer for two different light beams in accordance with the principles of the invention.
Figure 6B:
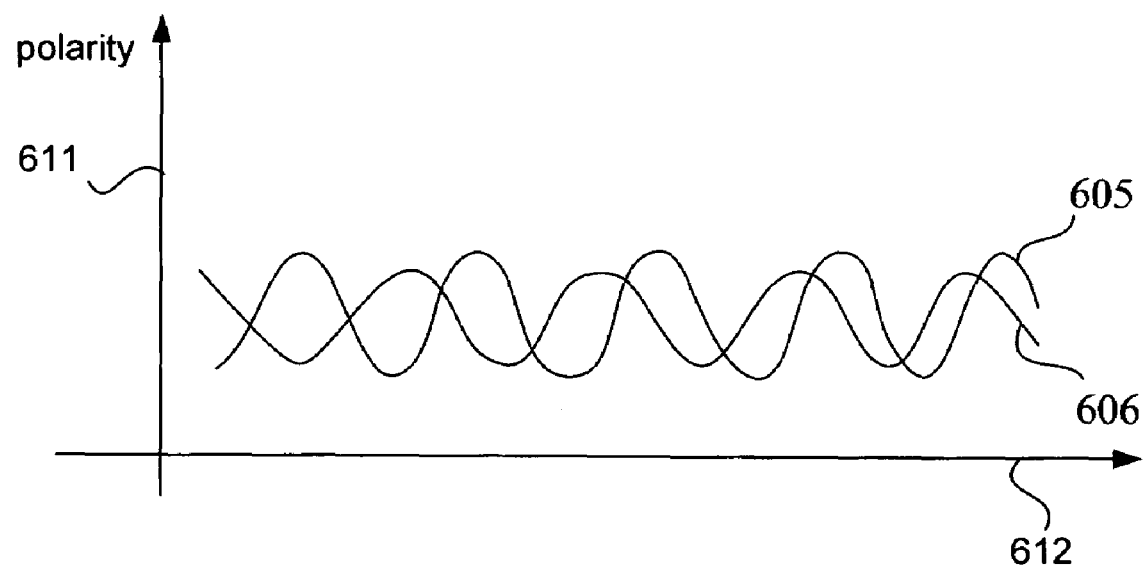

Referring to FIGS. 6(*a*) and 6(*b*), further optical parameters can be used to characterize the surface of a wafer. In the depicted examples, the reflected optical signal can be measured in terms of optical parameters for reflected beam phase and polarization. Such phase and polarization measurements can be made of the reflected light and used to characterize the surface of a wafer. As depicted in FIG. 6(*a*), the phase change between the illuminating beam and the reflected beam can be determined and used to characterize the surface of a wafer. In particular, such information can be used to determine the thickness of a partially reflective layer on the surface of a wafer. As with the previously discussed measurements of reflected light intensity, measurements of phase change (also referred to herein as phase measurements) are also dependent on the thickness of the partially reflective layer. Thus, the measurements of phase change can be plotted with respect to the vertical axis 601 and the measurements of thickness t for the partially transmissive material can be plotted with respect to the vertical axis 602. In the depicted embodiment, the wafer is illuminated at two different wavelengths. As can be seen from the simplified schematic plot, first pattern 603 of phase change relative to thickness t at a first wavelength $\lambda_1$ is different from a second pattern 604 of phase change relative to thickness t at a second wavelength $\lambda_2$. Thus, the same point on the surface will provide two different values for phase change depending on the wavelength of light used to illuminate the surface. Thus, same process as schematically depicted with respect to FIG. 3 can be used to determine thickness for the partially transparent layer. The only difference being that the optical parameter is phase change for the reflected beams rather than intensity of the reflected beams. Additionally, the phase change information can be parameterized in a fashion analogous to that depicted in FIG. 4. Again, the only difference being that the optical parameter used is phase change for the reflected beams rather than intensity of the reflected beams.

As depicted in FIG. 6(*b*), the change in polarity between the illuminating beam and the reflected beam can be determined and used to characterize the surface of a wafer. In particular, such information can be used to determine the thickness of a partially reflective layer on the surface of a wafer. As with the previously discussed measurements of reflected light intensity, measurements of change in polarity (also referred to herein as ellipsometry) are also dependent on the thickness of the partially reflective layer. Thus, the measurements of polarity (or change in polarity) can be plotted with respect to the vertical axis 611 and the measurements of thickness t for the partially transmissive material can be plotted with respect to the vertical axis 612. In the depicted embodiment, the wafer is illuminated at two different wavelengths (e.g., $\lambda_3$, $\lambda_4$). As can be seen from the simplified schematic plot, one pattern 606 of polarity relative to thickness t determined at a first wavelength $\lambda_3$ is different from a another pattern of polarity relative to thickness t determined at a second wavelength $\lambda_4$. Thus, the same point on the surface will provide two different values for polarity depending on the wavelength of light used to illuminate the surface. Thus, same process as schematically depicted with respect to FIG. 3 can be used to determine thickness for the partially transparent layer. The only difference being that the optical parameter is the polarity of the reflected beams rather than intensity of the reflected beams. Additionally, the polarity information can be parameterized in a fashion analogous to that depicted in FIG. 4. Again, the only difference being that the optical parameter used is polarity for the reflected beams rather than intensity of the reflected beams. In some embodiments, three different input polarizations can be provided, P-polarization aligned parallel to the plane of incidence; S-polarization aligned perpendicular to the plane of incidence; and circular polarization which is characterized by continuously varying incident polarization, alternating between s-polarization and p-polarization, at the frequency of the light wave. These ellipsometric parameters, which characterize the relative amplitudes of the reflection coefficients for the P-and S-polarizations and their differences in phase are well known and widespread in the literature. It should also be noted that the angle of the reflected optical signal can be measured and used to provide surface characterization information in a manner analogous to that described above with respect to intensity, polarity, and phase.

Figure 7A:
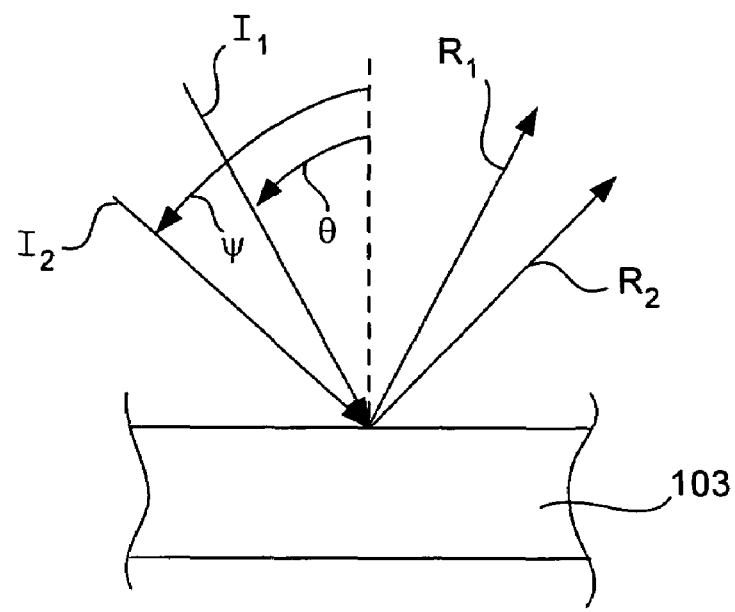
FIGS. 7(a) and 7(b) depict light beams directed onto a surface being inspected and the resultant reflected optical signal and a graphical depiction of the intensity of the reflected optical signal over a range of different thicknesses for a partially transmissive layer formed on the surface.
Figure 7B:
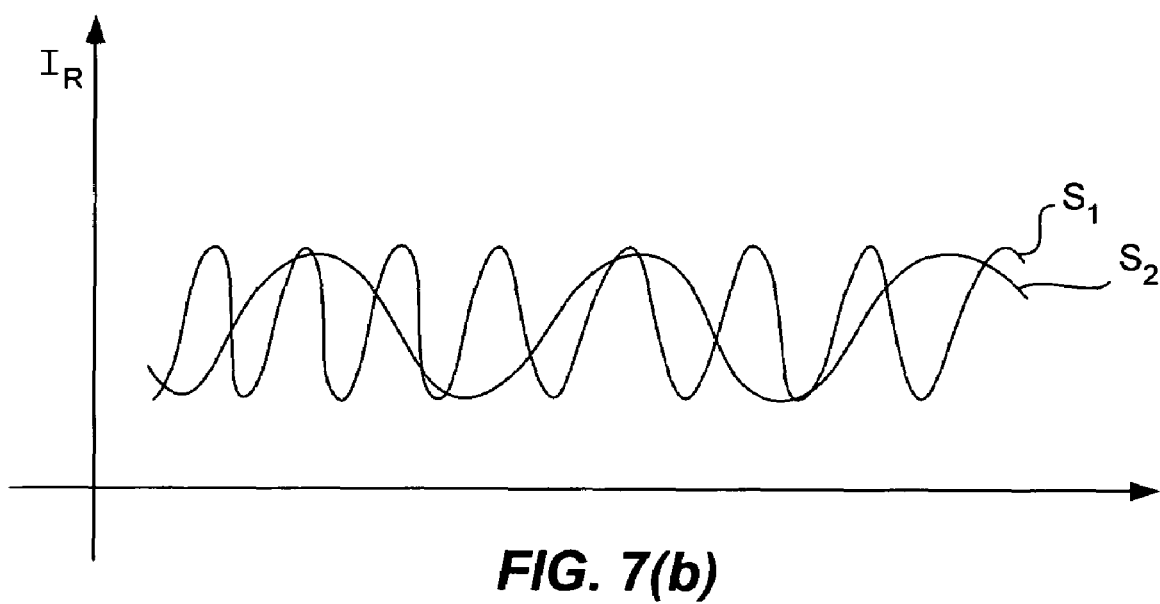

In addition to using two (or more) light beams at different wavelengths, the illuminating light beams can be directed onto the surface at two (or more depending on the number of beams) different angles of incidence. Alternatively, embodiments of the invention can use two (or more) light beams at the same wavelength but at different angles of incidence. FIG. 7(*a*) illustrates one typical embodiment. A first beam $I_1$ is directed onto the surface at a first angle $\theta$ and a second beam $I_2$ is directed onto the surface at a second angle $\psi$ such that reflected beams $R_1$, $R_2$ corresponding to each of the incident beams $I_1$, $I_2$ are formed. Each of these reflected beams are detected at appropriate light collection angle and the desired optical parameters are measured and used to characterize the wafer surface (e.g., to determine the thickness of a partially transmissive surface layer). In the depicted embodiment, the same wavelength light is used for each illuminating beam $I_1$, $I_2$. In the embodiment depicted in FIG. 7(*b*), curves correlating the intensity $I_R$ of the reflected beams $R_1$, $R_2$ to the thickness of a partially transparent layer can be called up from system memory and used to characterize the surface of the wafer. As can be seen, the two beams at different angles have different patterns. In general, the steeper the angle of incidence, the shorter the period of repetition in the pattern. This is clearly depicted by FIG. 7(*b*) wherein the optical signal $S_1$ corresponding to the first reflected beam $R_1$ has a shorter periodicity than the optical signal $S_2$ corresponding to the second reflected beam $R_2$. As described hereinabove with respect to, for example, FIGS. 3, 4, and 5 two (or more) optical signals can be used to determine the thickness of a partially transmissive surface layer.

Figure 8A:
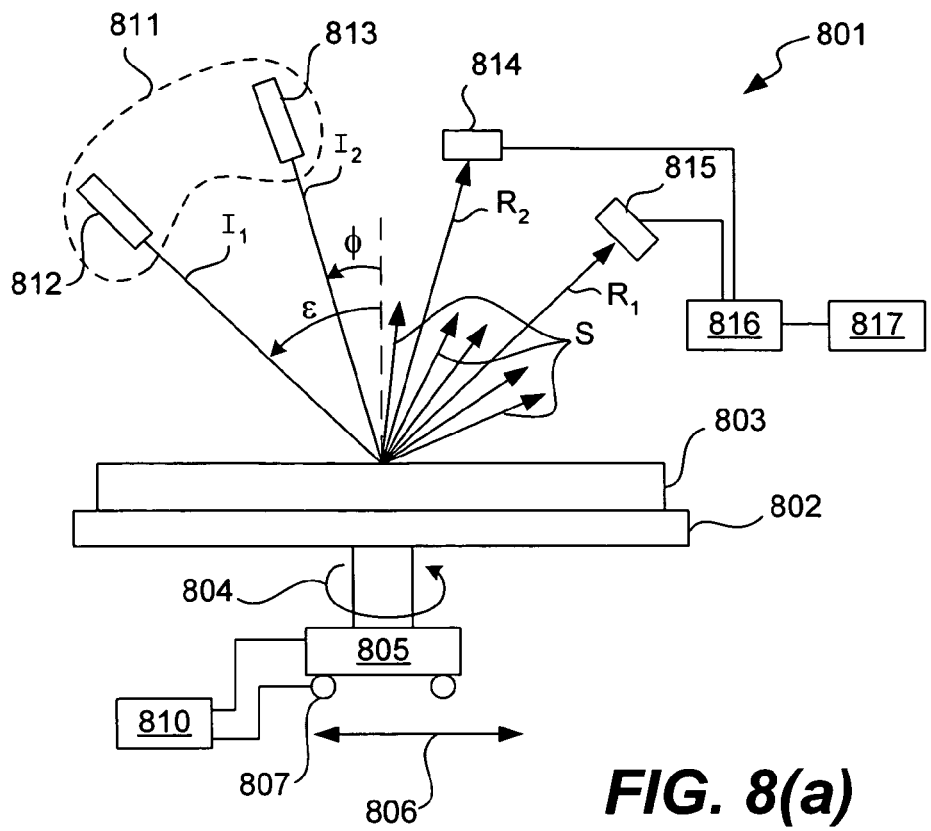
FIGS. 8(a) and 8(b) are simplified block diagrams of two embodiments of apparatus constructed in accordance with the principles of the invention.

FIGS. 8(*a*) and 8(*b*) are simplified block depictions of two example apparatus embodiments constructed in accordance with the principles of the invention. Referring to FIG. 8(*a*), a first embodiment 801 is depicted. The depicted embodiment includes a support 802 for a wafer 803. Although an un-patterned wafer is mentioned as the target object, other substrates, particularly, un-patterned wafers having partially transmissive layers can be inspected. Also, the inventor contemplates target objects with other coated surfaces, such as reflective glass, reflective metallization layers, or composite materials, or other surfaces may be tested and measured by the present invention. Also, patterned surfaces (e.g., patterned wafers) can be inspected in accordance with the principles of the invention as will be described later.

The support 802 commonly includes a wafer chuck using a vacuum to keep the wafer 802 in place on the support 802. Of course, the wafer 803 can be secured to the support 802 using numerous other approaches. Relative motion between the wafer 803 and the incident beams $I_1$, $I_2$ is provided. Typically, the support 802 of the depicted embodiment provides a relative motion relative to incident beams $I_1$, $I_2$ by rotating 804 the wafer 803. The rate of rotation for the wafer 803 is controlled by a motor 805 which is typically controlled by a computerized control system 810. An additional radial dimension 806 of motion is provided such that as the wafer is rotated the incident beams $I_1$, $I_2$ radially move across the wafer surface generating a spiral scanning pattern that can scan the entire wafer 803 surface, if desired. Such radial motion can be directed using, for example, a stage motor (schematically depicted by 807) that is also controlled by the computerized control system 810. The position of the support 802 (and hence the wafer 803) is known and carefully controlled by the computerized control system 810. The particular form of scanning and wafer transport mechanisms is not important so long as the wafer position is known and can be moved relative to the incident beams $I_1$, $I_2$.

An illumination element 811 typically includes a first light source 812 for producing first beam $I_1$ and second light source 813 for producing second beam $I_2$. The light sources 812 and 813 commonly produce beams having a single wavelength (e.g., using single wavelength lasers or filtered polychromatic lamps). Alternatively, multi-wavelength lasers can be used to produce both beams. In some embodiments (discussed later) one or more unfiltered polychromatic sources can be used. In the depicted embodiment, the first beam $I_1$ and the second beam $I_2$ each have the same wavelength and are directed onto the wafer 803 at different angles of incidence ($\epsilon$ and $\phi$, respectively). These beams $I_1$, $I_2$ impinge on the wafer producing a scattered light signal S and reflected light signals $R_1$, $R_2$.

The scattered light S is collected and measured by photosensor elements (not shown) constructed and arranged for such purposes. This scattered light is typically used for defect detection and analysis. In most prior art systems, the reflected light signals (e.g., $R_1$, $R_2$) are not detected or measured. But, in embodiments of the present invention, the reflected light signals are detected and used to further characterize the wafer surface. Detector elements 814 and 815 are arranged to detect the reflected light signals $R_1$, $R_2$. Many different discrete and array type detectors can be used as detector elements 814 and 815. In some implementations, photo-multiplier tubes (PMT's) can be used. Additionally, charge-coupled device (CCD) detector arrays can used. Also, many other types of devices and detector arrangements can also be used, including, but not limited to, discrete photodetector devices, CMOS arrays, multi-cathode PMT's, photodiode arrays, and other array photodetectors known to persons having ordinary skill in the art. Additionally, polarization detectors and phase detectors can be used to implement the embodiments of the invention. The detector elements 814 and 815 convert the reflected light signal $R_1$, $R_2$ to an electrical signal that is transmitted to other processing circuitry 816 of the system for analysis. Typically, the processing circuitry 816 includes a look-up table or a film thickness calculator 817 generated using stored values or calculated values. A film thickness calculator 817 is programmed with standard film thickness formulas based on material properties for the partially reflective material and reflected optical signal parameters. For example, such formula can be base on the intensity of the reflected optical signal and the angle of the incident beam. Such a calculator 817 may be part of processing circuitry 816 but is shown as a separate block because a different function is performed. Formulas for computing thin film thickness using discrete wavelengths are well known in the prior art pertaining to for example, the field of reflection ellipsometry. Once the thin film determination is made, a signal representing the thin film thickness is transmitted to processing circuitry 816. The processing circuitry 816 then can adjust particle/defect size measurements based upon the intensity of scattered light from a scattering detector (not shown).

It should be noted that a KLA-Tencor Model DLS inspection tool (produced by KLA-Tencor Corporation of San Jose, Calif.) can be modified to incorporate the principles of the present invention. In alternative embodiments, the beams (e.g., $I_1$, $I_2$) can include beams having different wavelengths in addition to being projected at different angles. Additionally, embodiments having three or more beams can also be used. Such beams can be directed onto the wafer at different angles and at different wavelengths in accordance with the principles of the invention. Such implementations can employ additional detectors to detect the additional beams. Moreover, different types of detectors can be used (e.g., phase and wavelength sensitive detectors). Moreover, the detectors can be positioned to detect light at different light collection angles.

Figure 8B:
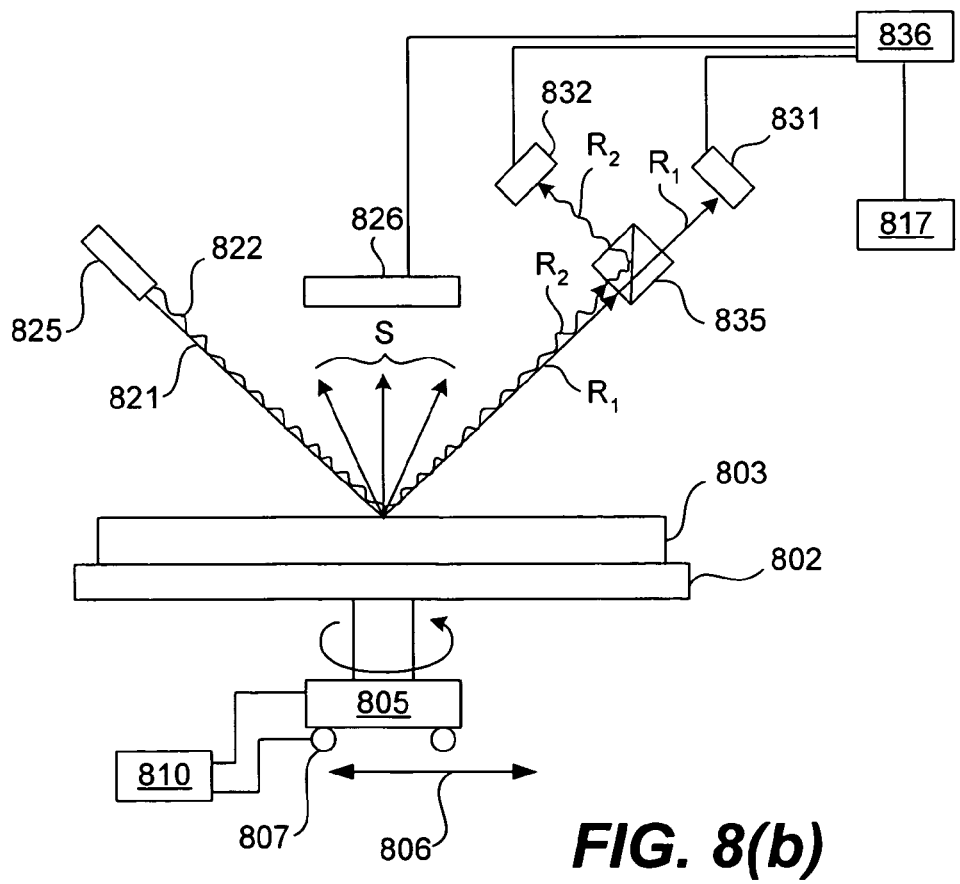

FIG. 8(b) depicts a block diagram of an alternative embodiment. As with the foregoing embodiment, the apparatus includes a support 802 for a wafer 803. Again, a variety of substrates can be inspected. As before, the wafer 803 is secured to the support 802 and the support 802 provides a relative motion relative to incident beams 821, 822 by rotating 804 the wafer 803. The rate of rotation for the wafer 803 is typically controlled by a motor 805 which is typically controlled by a computerized control system 810. Also as above, a radial dimension 806 of motion can be provided to generate a spiral scanning pattern that can scan the entire wafer 803 surface, if desired. Again such radial motion can be directed using, for example, a stage motor (schematically depicted by 807) that is also controlled by the computerized control system 810. As before, the position of the support 802 is known and carefully controlled by the computerized control system 810.

An illumination element 825 typically includes a light source for producing a first beam 821 at a first wavelength and for producing a second beam 822 at a second wavelength. Such a source can comprise two or more lasers, each producing a beam of a different wavelength. Alternatively, the source can comprise a polychromatic source filtered to produce two (or more) bandwidths of substantially monochromatic light. Still alternatively, multiple wavelength lasers (lasers capable of producing more than one wavelength of light) can be used to generate light at a multiplicity of wavelengths. In the depicted embodiment, the first beam 821 having a first wavelength and a second beam 822 having a second wavelength are each directed onto the wafer 803 at the same angle of incidence. The beams 821, 822 impinge on the wafer producing scattered light S and reflected light beams $R_1$, $R_2$.

The scattered light signal S can be collected and measured by the schematically depicted photosensor element 826. As before, this scattered light is typically used for defect detection and analysis. Additional detector elements 831 and 832 are arranged to detect the reflected light signals $R_1$, $R_2$ respectively. As depicted here, a dichroic beamsplitter is used to direct the reflected signals $R_1$, $R_2$ onto the appropriate detectors. As before, many different discrete and array type detectors can be used as detector elements 821, 823. In some implementations PMT detectors and CCD detector arrays can be used. Again, as before, many other types of devices and detector arrangements can also be used, including, but not limited to, discrete photodetector devices, CMOS arrays, multi-cathode PMT's, photodiode arrays, and other array photodetector devices known to persons having ordinary skill in the art. Additionally, polarization detectors and phase detectors can be used to implement the embodiments of the invention. Polarization detectors and phase detectors can be used to detect the reflected light signals $R_1$, $R_2$ and convert the signal to an electrical signal that is transmitted to other processing circuitry 836 of the system for analysis.

As before typical processing circuitry 836 includes a look-up table or a film thickness calculator 817 generated using stored values or calculated values. Once the thin film determination is made, a signal representing the thin film thickness is transmitted to processing circuitry 836. The processing circuitry 836 then can adjust particle/defect size measurements based upon the intensity of scattered light from a scattering detector (not shown). Additionally, the scattered light from beams can be detected using photo detector elements of the system. In particular, the photosensor element 826 can comprised a plurality of different detector devices. Additionally, such devices can be configured to detect different optical conditions (polarization, wavelength, etc.) and can also be sited to detect light at differing light collection angles.

Again, in alternative embodiments, the beams (e.g., 821, 822) can further include additional beams having different wavelengths. Further detectors can also be included to detect the additional beams.

Conventional tools can continuously scan an un-patterned bare substrate and measure the scattered light from an incident beam to detect defects. Conventional tools cannot accomplish this continuous scanning if a partially transmissive layer is present on the substrate for reasons discussed previously. Conventional tools cannot continuously scan a substrate to determine the thickness of a partially transmissive layer formed thereon. Thus, in conventional tools continuous scanning cannot be used to detect and determine the size of defects in the presence of a partially transmissive layer. One advantageous feature of embodiments of the invention is that they can continuously scan the entire wafer surface simultaneously detecting a reflected optical signal and a scattered light signal from the same point on the surface to simultaneously determine the thickness of the partially transmissive layer and using that information together with the scattered optical signal for the same point to determine the location and size of defects on a substrate.

Figure 9:
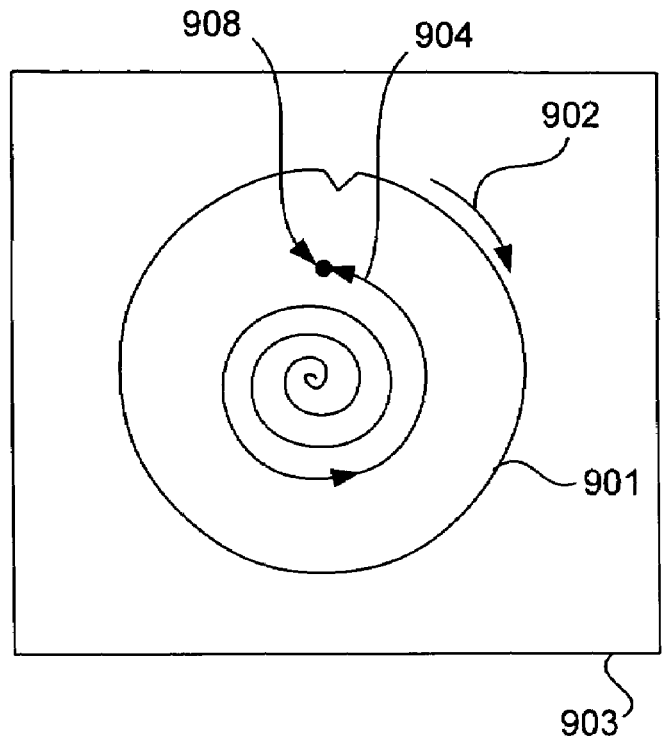
FIG. 9 is a simplified schematic top down view of a wafer being rotated in a spiral inspection pattern while being scanned in a continuous scanning pattern in accordance with the principles of the invention.

FIG. 9 is a simplified schematic top down view of a wafer being rotated 902 while being scanned by an inspection tool (schematically depicted by the box 903). The entire wafer 901 can be scanned in one continuous scanning pattern. Such a pattern is depicted by the spiral pattern 904. Spiral pattern 904 describes a path that a dot of light 908 maps across the wafer surface as the wafer is scanned.

The inventor contemplates that the reflected light optical signal of the embodiments of the invention can be used to create a map of the wafer surface. Such a map can be a map of a spatial distribution of the thickness of the partially transmissive layer across the surface of the wafer. Quantitative film thickness measurements where applicable, can be used to characterize and correct the deposition parameters of a film layer controller. It may also be recognized that reflectivity measurements and/or a qualitative or relative film thickness determination, is also quite useful for correcting particle/defect count and size measurements as well, and for providing information on the quality or uniformity of any surface or thin film, transparent or opaque.

Moreover, because the reflected light signal can be measured in terms of more than just reflected light intensity (e.g., also in terms of polarity, phase, and even angle) a map of any of the measured optical parameter values for the reflected light optical signal can be made. Such a map is merely a plot of the spatial distribution of measured optical parameter values for the reflected beam across the surface of the wafer. Such maps can be used to determine the background "haze" of a wafer, the topography of a wafer, as well as many other surface characteristics of the wafer. Additionally, such maps of measured optical parameters for reflected light can be used to ascertain process defects associated with marked changes in such measured parameter values. For example, such a wafer map can consist of a plot of reflected signal intensity over the wafer surface. Alternatively, such plots can describe the surface of a wafer in terms of other reflected light optical parameters including, but not limited to, reflected light polarity, reflected light phase, the angle of reflectance for the reflected light, and so on. Such implementations are very useful, not only in characterizing surfaces with partially transmissive layers formed thereon, but also, in characterizing surfaces formed of materials that are opaque to the wavelengths of light used to illuminate the surface. Examples of such surfaces include, but are not limited to untreated silicon wafers and metal coatings formed on wafers.

In another implementation, the principles of the present invention can be applied to patterned wafers. Patterned wafers can be constructed with specialized test sites formed thereon to facilitate surface characterization. Measurements of the reflected light signal can be used to assess whether a fabrication step(s) fall within a desired critical dimension (CD) tolerance or whether the overlay alignment between two fabrication layers is within a desired specification. Such characterization of a wafer can be accomplished using a plurality of test sites fabricated on the wafer. The wafer is illuminated with a polychromatic light beam and scanned. The reflected light signal from the polychromatic light beam produces a reflected light intensity spectrum. As the polychromatic light beam is directed onto the test sites and the corresponding reflected light intensity spectrum is measured, changes to the spectrum can be analyzed to determine the width and depth of wafer CD's. One suitable type of test site is a diffraction grating having a pre-determined evenly spaced pattern defining a regular pitch for the grating.

Figure 10:
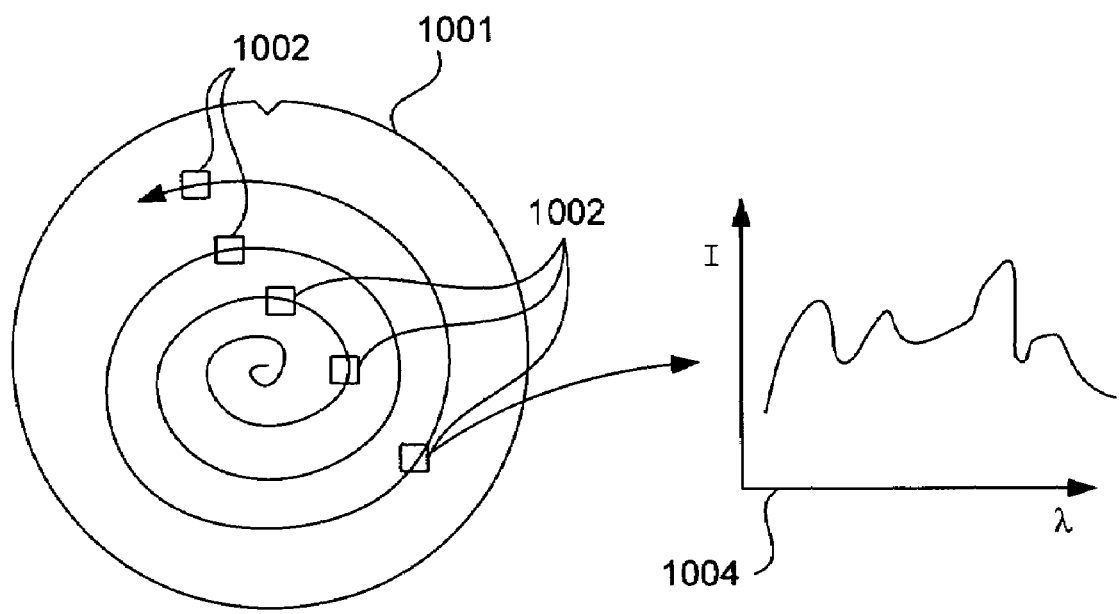
FIG. 10 is a simplified schematic top down view of a wafer being rotated in a spiral inspection pattern to illuminate test patterns to produce the associated reflected light spectra in accordance with the principles of the invention.

FIG. 10 schematically illustrates an implementation for such a CD measurements. A wafer 1001 having a plurality of test sites 1002 formed thereon is scanned with a polychromatic light beam. A spiral scanning pattern 1003 is depicted. The optical signal for the reflected light beam is detected continuously and saved to a memory. The memory is then accessed and the optical signals corresponding to the test sites 1002 are then accessed. Each such signal generates a corresponding optical spectrum 1004. The spectrum can then be analyzed versus the expected spectrum for such a grating. Deviations from the expected spectrum can be used to identify the scope and magnitude of variations from the desired CD or desired overlay. Such methodologies are known to those having ordinary skill in the art.

The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. In particular, the inventor contemplates that embodiments using two, three, four, and more light beams are advantageous. Moreover, embodiments using different angles of incidence and different wavelengths for the illuminating beams are specifically contemplated as advantageous by the inventor. Further, embodiments incorporating a large plurality of detector devices are also contemplated by the principles of the invention. Such embodiments can incorporate detectors configured to detect light receiver from many different collection angles. Further, such detectors can detect specific wavelengths of light, polarities of light, or other light qualities as known to those having ordinary skill in the art. Further, reference in the claims to an element in the singular is not intended to mean "one and only one" unless explicitly stated, but rather, "one or more". Furthermore, the embodiments illustratively disclosed herein can be practiced without any element, which is not specifically disclosed herein.

I claim:

1. A method for conducting surface inspections comprising:

providing a workpiece having a at least one partially transmissive layer formed thereon;

scanning the surface of the workpiece with at least two light beams to generate at least two reflected light signals having light intensity values;

detecting the light intensity of the reflected light signals; and processing only the detected light intensity values of the reflected light signals to obtain thickness measurements for the at least one partially transmissive layer formed at the surface of the workpiece, wherein said processing comprises:

accessing a parametric reflected intensity curve that associates thickness of the at least one partially transmissive layer with two detected light intensity values for the reflected light signals generated by the at least two light beams; and comparing the two detected light intensity values with the light intensity values of the parametric curve to obtain thickness measurements for the at least one partially transmissive layer.

2. The method of claim 1 wherein comparing the two detected light intensity values with the light intensity values of the parametric reflected intensity curve to obtain thickness measurements includes disambiguating ambiguous measurements by scanning toward a portion of the workpiece having a non-ambiguous thickness measurement to resolve the ambiguity and then obtaining a thickness measurement for the at least one partially transmissive layer.

* * * * *